(12) United States Patent
Marchant et al.

(10) Patent No.: US 11,565,228 B2
(45) Date of Patent: Jan. 31, 2023

(54) RISER SEPARATION SYSTEMS

(71) Applicant: T.EN PROCESS TECHNOLOGY, INC., Houston, TX (US)

(72) Inventors: Paul Marchant, Katy, TX (US); Raj Kanwar Singh, Houston, TX (US)

(73) Assignee: T.EN Process Technology, Inc., Houston, TX (US)

( * ) Notice: Subject to any disclaimer, the term of this patent is extended or adjusted under 35 U.S.C. 154(b) by 0 days.

(21) Appl. No.: 17/330,354

(22) Filed: May 25, 2021

(65) Prior Publication Data

US 2022/0379279 A1 Dec. 1, 2022

(51) Int. Cl.

| *B01J 8/24* | (2006.01) |
| *B01J 4/00* | (2006.01) |
| *B01D 45/08* | (2006.01) |
| *B01D 45/16* | (2006.01) |

(52) U.S. Cl.
CPC ............... *B01J 8/24* (2013.01); *B01D 45/08* (2013.01); *B01J 4/001* (2013.01); *B01D 45/16* (2013.01); *B01J 2208/00938* (2013.01)

(58) Field of Classification Search
CPC .... B01J 8/24; B01J 4/001; B01J 2208/00938; B01D 45/08; B01D 45/16
USPC ....................................................... 422/142
See application file for complete search history.

(56) References Cited

U.S. PATENT DOCUMENTS

| 4,664,888 A | 5/1987 | Castagnos, Jr. |
| 6,296,812 B1 | 10/2001 | Gauthier et al. |
| 10,731,086 B2 | 8/2020 | Marchant et al. |
| 2010/0175553 A1 | 7/2010 | Andreux et al. |

FOREIGN PATENT DOCUMENTS

| FR | 2767715 A1 | 3/1999 |
| WO | 2021115794 A1 | 6/2021 |

OTHER PUBLICATIONS

PCT International Search Report and Written Opinion, dated Sep. 5, 2022, issued during the prosecution of corresponding PCT International Patent Application No. PCT/US2022/030915; 14 pages.

*Primary Examiner* — Huy Tram Nguyen
(74) *Attorney, Agent, or Firm* — Locke Lord LLP; Alan B. Clement; Alicia J. Carroll (57) ABSTRACT

An apparatus includes a riser reactor within the reaction vessel. The riser reactor defines a longitudinal axis and including a riser reactor inlet at one end and at least one riser reactor outlet at an opposite end. The apparatus includes a separation vessel including at least one separation chamber and at least one collection chamber distributed in an alternating manner about the longitudinal axis. Each separation chamber comprises two vertical lateral walls which also comprise a wall of an adjacent one of the at least one collection chamber. A lateral separation chamber outlet is defined in at least one of the vertical lateral walls to provide fluid and particle communication from the lateral separation chamber to the adjacent one of the at least one collection chamber. The separation vessel includes at least one collection chamber deflector positioned in the at least one collection chamber.

37 Claims, 8 Drawing Sheets

RISER SEPARATION SYSTEMS

BACKGROUND

1. Field

The present disclosure relates to any vapor-particulate operations using a high velocity, dilute phase lift line (or riser reactor), such as the Fluid Catalytic Cracking (FCC) process.

2. Description of Related Art

The FCC process has become well-established in the petroleum refining industry for converting low value high boiling range petroleum fractions into high value lower boiling products, especially gasoline, propylene and other light olefins.

In the FCC process finely divided solid catalyst particles promote cracking reactions by providing both the heat for the reaction and the catalytic activity. The finely divided form of the catalyst can be made to behave like a fluid (hence the designation Fluid Catalytic Cracking) and it flows in a closed cycle between a cracking zone (riser reactor) and a separate regeneration zone connected with transfer lines, generally referred as standpipes or lift lines.

The reaction zone of an FCC unit generally consists of two parts; a riser reactor and an apparatus known to those skilled in the art as a Reaction, or Riser Termination Device (RTD) to rapidly separate the catalyst and reaction products. The RTD system is generally located at the outlet of the riser reactor and housed in a reactor vessel for mechanical considerations, this vessel also contains other devices important for the operation of the process. Once separated from the catalyst, the reaction products are routed away from the vessel to be quenched and split into the desired fractions.

In the riser reactor, hot catalyst comes in contact with liquid oil feed causing it to vaporize and allow the desired gas phase cracking reactions to proceed in which various hydrocarbon products, as well as solid coke deposits on the catalyst, are formed. At the end of the riser reactor, a rapid separation of catalyst from hydrocarbon product is desirable to control the reaction time to avoid over-cracking the hydrocarbon vapors. Constraining hydrocarbon conversion time to the riser reactor is desirable as this zone is designed to ensure intimate mixing of the vapor and solid catalyst. Once the mixture leaves the riser reactor, less intimate contact can occur in the containment/separation vessel and undesirable thermal cracking reactions can occur which leads to loss of valuable products and generation of low value by-products. Containing the hydrocarbon vapors within the RTD and routing them as directly as possible out of the system minimizes the residence time at high temperature that results in thermal degradation. It is also desirable to quickly and completely separate the hydrocarbons vapors from the catalyst to end the catalytic cracking reactions. Two stages of vapor-catalyst separation are required to achieve a very high catalyst recovery; the RTD is considered the primary stage of separation, the secondary separation step consists of multiple high-efficiency cyclones. During the primary separation, hydrocarbon vapor is separated from majority of the catalyst and leaves the RTD through a gas outlet tube connected directly to the secondary separation step. Separated catalyst flows down another chamber known as a dipleg at the lower end of the primary separator into the stripping bed. As catalyst flows down the diplegs it entrains some hydrocarbon vapor. Catalyst and entrained hydrocarbon leave the RTD and flow into a stripping zone where they are further separated. As catalyst passes through the stripping zone the hydrocarbon vapor between, and inside, the particles are removed by a counter current flow of stripping steam. Catalyst free of gaseous hydrocarbons but fouled with solid hydrocarbon coke leaves the stripping zone and enters a regeneration zone.

Following primary gas catalyst separation, the catalyst flows into a stripper bed below the RTD, where it is contacted counter currently with stripping gas to remove any remaining volatile hydrocarbons entrained with the catalyst. The hydrocarbon stripped catalyst, typically referred to as spent catalyst, containing solid coke deposits is passed to a catalyst regeneration zone, where the coke is burned off, and catalytic activity is restored. The regeneration step releases energy and raises the catalyst temperature, after the coke deposits are burnt off, the hot regenerated catalyst flows back into the reaction zone. Hydrocarbon vapor separated from the catalyst, flows to a downstream distillation system for fractionation into several products. The FCC unit comprising of the riser reactor regenerator assembly is self-heat balanced in that heat generated by the burning of coke in the regenerator matches the heat required for feed vaporization and the heat for the cracking reactions.

Prior art riser separation systems typically have two separation chambers with accompanying diplegs and a consecutive number of gas collection chambers for separation of gas and the catalyst material, respectively. U.S. Pat. No. 6,296,812 to Gauthier et al. provides an apparatus for separating a mixture of gas and particles having an envelope comprising separation chambers and circulation (e.g., gas collection) chambers distributed in connection with a riser separation system. The upper portion of each separation chamber has an inlet opening communicating with the riser reactor and a middle zone for rotating the mixture in a vertical plane and a lower zone known as dipleg to collect the separated catalyst particles. Each separation chamber comprises two lateral walls which are also walls for the circulation chamber, at least one of the walls of each chamber comprising a lateral outlet opening for mixing gas and particles into the adjacent circulation chamber. The gas collection chamber has two additional openings, one at the top connected to an gas outlet tube which further connects to the secondary separator and a lower opening to communicate with the so called dilute phase of the reactor vessel above the stripper bed below. The application of this apparatus is to fluidized catalytic cracking of hydrocarbons in a riser but equally may be applied to other, similar, processes.

The Gauthier et al. device has multiple separation and circulation chambers and each separation chamber has its own dipleg comprising a particle outlet opening communicating below the separation chambers with a stripper bed. In the Gauthier et al. device the riser vapor and catalyst mixture is forced to change direction before entering the separating chambers through windows in the riser top taking a one-quarter (¼) turn before separating from each other. The vapor then enters the collection chamber after taking an additional 180° turn underneath the separation chamber's deflector. Catalyst flows down the separating chamber into diplegs, designed for low mass flux to maximize gas disengagement. This device is mainly used as a primary separation device for catalyst and vapor for internal riser systems contained within the reactor/stripper vessel. Stripping gas and hydrocarbon vapors entrained from the separation chamber diplegs into the reactor, enters the collection chambers through the lower conduit, mixes with the riser vapor from the separation chambers before entering the gas outlet tube/collector and then flows into cyclones—secondary separator for final gas/catalyst separation. The Gauthier device addresses the objectives of separation and transport however solids collection efficiency is lower than expected. The inlet to the separating chamber has a severe 90° turn from the riser top and provides only a ¼ turn for gas and catalyst to separate, which is not sufficient to cleanly separate gas and catalyst from each other. The severe 90° change in direction creates a turbulent catalyst flow regime at the inlet there is insufficient time to develop the necessary flow structure to achieve good separation of the cracked gases from solid catalyst particles in the subsequent ¼ turn. There is no connection between the separating chambers creating the potential for uneven pressure distribution resulting in uneven loading to each chamber, thus resulting in low separation efficiency.

Another type of riser separation system, such as, U.S. Pat. No. 10,731,086 to Marchant et al. includes an RTD design with additional features in the separation chamber providing improved gas solid separation and gas containment. These features include a contoured riser top to provide a smooth 180° turn to gas catalyst flow to minimize flow turbulence at riser top and promote gas catalyst separation, and a single (common) dipleg for the separation chamber. Marchant et al. also provides a more compact design reducing overall volume and post-riser residence time, and balanced flow distribution to each separation window improves stability of the operation. Marchant et al. also describes a disc-like or donut-shaped baffle above the catalyst bed in the separation chamber dipleg to deflect momentum of separated catalyst particles and reduce re-entrainment of separated catalyst.

Another type of riser separation system, such as, U.S. Pat. No. 4,664,888 to Leonce F. Castagnos, includes a deflecting device. The Castagnos patent is directed to a rough cut catalyst-vapor separator for fluid catalyst cracking risers which is located at the outlet of a riser and causes the oil-catalyst mixture to undergo a tight 180° downward turn. The centrifugal separator is equivalent to one-half a turn inside a cyclone and causes most of the catalyst to move to the wall. Most of the hydrocarbon vapors are squeezed out away from the wall. At the end of the separator is a shave-off scoop positioned to divide a predominantly catalyst phase from a predominantly hydrocarbon vapor phase. The shave-off scoops conduct the catalyst phase away from the center of the vessel and deposit it near the vessel wall where its downward flow is continued under the action of gravity. The vapor phase continues its downward flow for a while but then must undergo a 180° degree turn and flow upward to exit the vessel through a series of conventional cyclone separators. However, the second 180° turn of the oil vapors can re-entrain the separated catalyst which negates the initial gas solid separation.

Castagnos also discloses an open semi-toroidal deflecting device and the gas/catalyst mixture exiting the riser impinge on the surface of the deflector wherein the catalyst particles are compressed against it and the separated gas phase is supposed to enter an open area below the edge of the deflector. As the gases separate from the particulate phase the solids tend to slow down and the effect of gravity negates the initial separation achieved. Any remaining compressed particulate phase flows onto a collection surface, the particles then flow down and off of the surface towards the wall of the vessel. The separated gases are supposed to flow up the conduits not re-contacting the particulate phase. As such, the pressure below the impingement surface and collection surface is higher than the pressure above them. This pressure differential forces gas not only through the conduits but also through the open area below the edge of the deflector and the collection surface, thus further negating the separation already achieved. Subsequently, the separated gas is "uncontained" in that it enters the vessel and experiences considerable residence time and undergoes significant post riser cracking.

The conventional techniques have been considered satisfactory for their intended purpose. However, there is a need for apparatuses to improve separation of the catalyst and vapor phases at the riser reactor exit. This disclosure provides a solution for this need. The present inventors have discovered a method and means to achieve improved catalyst and vapor phase separation, as well as improved gas collection efficiency, utilizing a riser separation system with a novel design providing an improved flow profile that promotes gas solid separation and improves operational stability.

SUMMARY

An apparatus for separating a gaseous mixture from a stream of particles entering from a riser reactor used for cracking a hydrocarbon feed with said stream of particles includes a reaction vessel comprising a lower stripping bed area and an upper secondary separator area. The apparatus includes a riser reactor within the reaction vessel. The riser reactor defining a longitudinal axis and including a riser reactor inlet at one end for receiving the hydrocarbon feed and the stream of particles and at least one riser reactor outlet at an opposite end for evacuating a mixture of cracked gases and solid particles. The apparatus includes a separation vessel defined proximate to the at least one riser reactor outlet. The separation vessel includes, in an alternating manner, at least one separation chamber and at least one collection chamber distributed about the longitudinal axis. Each separation chamber comprises two vertical lateral walls which also comprise a wall of an adjacent one of the at least one collection chamber. The at least one separation chamber includes a separation chamber inlet in an upper area of the separation chamber communicating with the riser reactor. A lateral separation chamber outlet is defined in at least one of the vertical lateral walls to provide fluid and particle communication from the lateral separation chamber to the adjacent one of the at least one collection chamber. The separation vessel includes at least one collection chamber deflector positioned in the at least one collection chamber.

In some embodiments, the at least one separation chamber includes two separation chambers. One of the at least one collection chambers is positioned between the two separation chambers. The at least one collection chamber deflector extends between one of the two vertical lateral walls of a first one of the two separation chambers and one of the two vertical lateral walls of a second one of the two separation chambers. Each collection chamber can include a collection chamber outer wall that includes a stripping gas entrance window to allow a stripping gas from at least one stripping gas injector proximate to the lower stripping bed area to enter the collection chamber. Each collection chamber can include a collection chamber floor that together with the collection chamber outer wall, the vertical lateral walls and the riser reactor define the collection chamber. The collection chamber deflector can include a concave surface facing the collection chamber floor. The collection chamber deflector can include a downward pointing cusp portion. The cusp portion can be centrally located between two of the vertical lateral walls.

In some embodiments, the chamber deflector can include a divider baffle extending from a concave surface of the collection chamber deflector. The divider baffle can extend beyond a lower edge of the deflector in a direction parallel to the longitudinal axis. The apparatus includes at least one collection chamber conduit in an upper area of the collection chamber for evacuating the cracked gases and a minor portion of the solid particles from the collection chambers to a gas outlet collector. The at least one collection chamber conduit can extend downward through the collection chamber deflector. Each collection chamber can include a collection chamber outer wall that extends from the lateral separation chamber outlet into the lower stripping bed area. Each collection chamber can include a collection chamber floor. The collection chamber floor, the collection chamber outer wall, the vertical lateral walls and the riser reactor can together define the collection chamber. The collection chamber outer wall can be a common collection chamber outer wall that extends towards the lower stripping bed in a continuous circumferential direction around the riser reactor. The collection chamber outer wall can include an inclination section towards the riser reactor and a vertical wall below the inclination section.

In some embodiments, each separation chamber further can include a separation chamber outer wall that extends from the separation chamber inlet towards the lower stripping bed area. The separation chamber outer wall and the collection chamber outer wall can terminate at the same vertical position relative to the longitudinal axis. The collection chamber outer wall can have a diameter equal to or smaller than a diameter of the separation chamber outer wall. At least one of the at least one separation chamber can include a separation chamber deflector positioned at least partially above the lateral separation chamber outlet. The separation chamber deflector can be unitarily formed with the collection chamber deflector. The at least one collection chamber deflector is positioned at least partially above the lateral separation chamber outlet.

In accordance with another aspect, an apparatus for separating a gaseous mixture from a stream of particles entering from a riser reactor used for cracking a hydrocarbon feed with said stream of particles includes a reaction vessel comprising a lower stripping bed area and an upper secondary separator area. The apparatus includes a riser reactor within the reaction vessel. The riser reactor defines a longitudinal axis and including a central riser reactor inlet at one end for receiving the hydrocarbon feed and the stream of particles and at least one riser reactor outlet at an opposite end for evacuating a mixture of cracked gases and solid particles. The apparatus includes a separation vessel defined proximate to the at least one riser reactor outlet. The separation vessel includes, in an alternating manner, at least one separation chamber and at least one collection chamber distributed about the longitudinal axis. Each separation chamber includes two vertical lateral walls which also comprise a wall of the adjacent collection chamber. The separation chamber including a separation chamber inlet in an upper area of the separation chamber communicating with the riser reactor. A lateral separation chamber outlet is defined in at least one of the vertical lateral walls to provide fluid and particle communication from the separation chamber to an adjacent one of the at least one collection chamber. Each collection chamber includes a collection chamber outer wall that extends from the lateral separation chamber outlet into the lower stripping bed area.

In some embodiments, the collection chamber outer wall is a common collection chamber outer wall that extends towards the lower stripping bed in a continuous circumferential direction around the riser reactor. The collection chamber outer wall can be similar to that described above.

It is contemplated that in some embodiments, the apparatus includes at least one collection chamber deflector positioned in the adjacent gas collection chamber at least partially above the lateral separation chamber outlet. The at least one collection chamber deflector can include a concave surface facing the lower stripping bed area. The at least one collection chamber deflector can be positioned at least partially above the lateral separation chamber outlet. The at least one separation chamber can be two separation chambers. One of the at least one collection chambers is positioned between the two separation chambers. The at least one collection chamber deflector can extend between one of the two vertical lateral walls of a first one of the two separation chambers and one of the two vertical lateral walls of a second one of the two separation chambers. The at least one collection chamber deflector can be the same as that described above. The collection chamber deflector can include a divider baffle similar to that described above. The apparatus can include at least one collection chamber conduit similar to the collection chamber conduit described above. At least one of the at least one separation chamber can include a separation chamber deflector positioned at least partially above the lateral separation chamber outlet. The separation chamber deflector can be unitarily formed with the collection chamber deflector.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
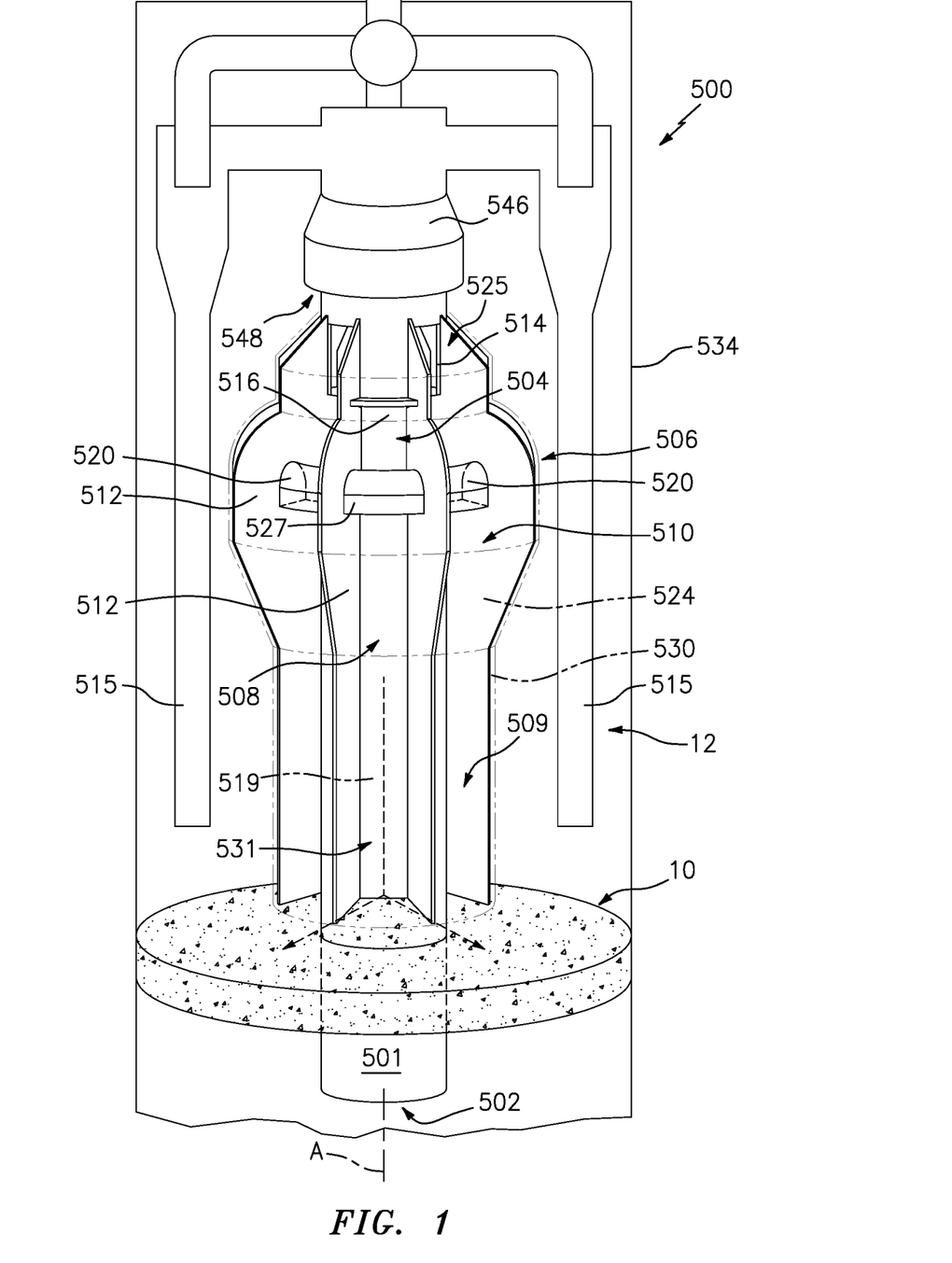
FIG. 1 is a schematic perspective view of an apparatus for separating a gaseous mixture from a stream of particles entering from a riser reactor used for cracking a hydrocarbon feed constructed in accordance with the present disclosure, showing a separation vessel having alternating separation chambers and collection chambers.

Reference will now be made to the drawings wherein like reference numerals identify similar structural features or aspects of the subject disclosure. For purposes of explanation and illustration, and not limitation, a partial view of an embodiment of an apparatus for separating a gaseous mixture from a stream of particles entering from a central riser reactor in accordance with the disclosure is shown in FIG. 1 and is designated generally by reference character 500. Other embodiments of systems in accordance with the disclosure, or aspects thereof, are provided in FIGS. 2-11 as will be described. The systems and methods described herein can provide separation vessels, e.g. RTDs, where the gas collection chamber is modified by creating a dipleg which is extended into the catalyst bed and/or where the gas collection chamber includes a deflector baffle.

Figure 2A:
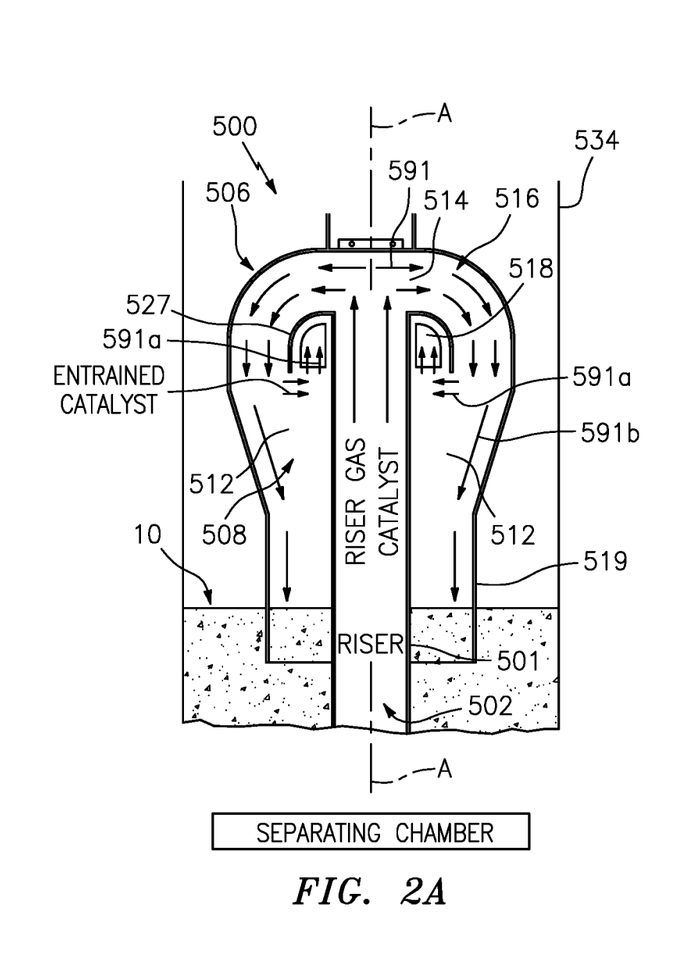
FIG. 2A is a schematic cross-sectional side plan view of the apparatus of FIG. 1, showing two separation chambers, ninety degrees apart.
Figure 2B:
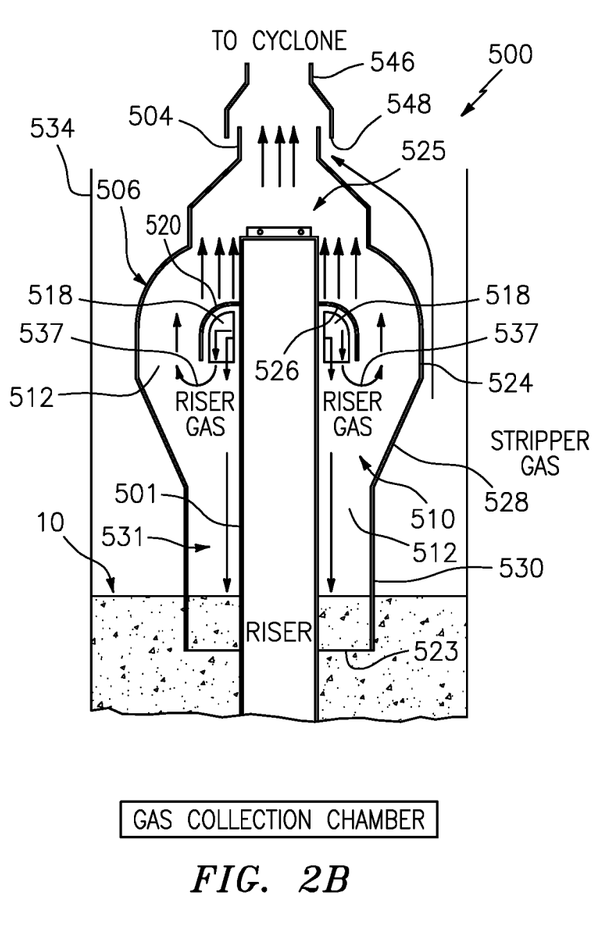
FIG. 2B is a schematic cross-sectional side plan view of the apparatus of FIG. 1, showing two collection chambers each with a collection chamber deflector under which gas from the separation chamber has to make a 180° turn prior to exiting via the outlet tube.

As shown in FIGS. 1-2B, an apparatus 500 for separating a gaseous mixture from a stream of particles entering from a central riser reactor 501 used for cracking a hydrocarbon feed with said stream of particles includes a reaction vessel 534 comprising a lower stripping bed area 10 and an upper secondary separator area 12. The riser reactor 501 is positioned centrally within the reaction vessel 534. The riser reactor 501 defines a longitudinal axis A and includes a riser reactor inlet 502 at one end for receiving the hydrocarbon feed and the stream of particles (indicated schematically by arrows, e.g. flow arrow 591) and at least one riser reactor outlet 504 at an opposite end for evacuating a mixture of cracked gases and solid particles to a separation chamber 508. The apparatus 500 includes a separation vessel 506 defined proximate to the riser reactor outlet 504. The separation vessel 506 includes, in an alternating manner, separation chambers 508 and collection chambers 510 distributed about the longitudinal axis A. Apparatus 500 includes a plurality of separation chamber outer walls 519 (shown translucently in FIG. 1) that each extend from their respective separation chamber inlets 514 in an upper area 516 of the separation chamber 508 into the lower stripping bed area 10. Each separation chamber 508 includes its own separation chamber outer wall 519 (shown translucently in FIG. 1). Apparatus 500 includes a collection chamber outer wall 524 (shown translucently in FIG. 1) of each collection chamber 510 extends from the lateral separation chamber outlet 518 toward and into the lower stripping bed area 10. Walls 524 and 519 forming a separation chamber dipleg area 509 and collection chamber dipleg area 531, respectively, are submerged in the lower stripping bed area 10.

With continued reference to FIGS. 1-2B, each collection chamber outer wall 524 includes an inclination section 528 that converges towards the riser reactor 501 and a substantially vertical wall 530, e.g. the dipleg, below the inclination section 528. Each vertical wall 530 forms a separate dipleg area 531 for each collection chamber 510. The substantially vertical wall 530 of the collection chamber outer wall 524 terminates in the lower stripping bed area 10. Each separation chamber outer wall 519 and the vertical wall 530 of the collection chamber outer wall 524 terminates at the same vertical position relative to the longitudinal axis A. The collection chamber outer wall 524 has the same or smaller diameter than the separation chamber outer wall 519. Because vertical wall 530 of the collection chamber outer wall 524 is submerged in the lower stripping bed area 10, apparatus 500 includes an open slip unit vent 548 to provide a flow path for stripping gas and entrained hydrocarbons to escape from the reactor to gas outlet tube 546 to a second stage separator. The diplegs (e.g. the vertical wall portions of the collection chamber outer wall 524 and the separation chamber outer wall 519 that extend into the catalyst bed) ensure all the hydrocarbons are contained with the RTD and no leakage of hydrocarbon vapors to the reactor, which results in maximum gas containment and potentially no chance for reactor coking.

With continued reference to FIGS. 2A and 2B, each separation chamber 508 comprises two substantially vertical lateral walls 512 which also comprise a wall of the adjacent collection chamber 510. The separation chamber 508, two of which are shown in FIG. 2A, includes a separation chamber inlet 514 in an upper area 516 of the separation chamber 508 communicating with the riser reactor 501. The gases/particulates (schematically shown with flow arrows 591) from riser 501 take an initial 90° turn from the riser reactor 501 (e.g. 90° from axis A) followed by another 90° around the separation chamber deflector 527. Gasses and entrained catalyst (schematically shown by flow arrow 591a) then take another 180° turn under the separation chamber deflector 527, while catalyst particles (indicated schematically with flow area 591b) separate from the gasses and drop to the catalyst bed 10. The apparatus 500 includes lateral separation chamber outlets 518 defined in each of the vertical lateral walls 512 to provide fluid and particle communication from the lateral separation chamber 508 to the adjacent collection chamber 510. The apparatus 500 includes at least one collection chamber deflector 520 positioned in the gas collection chambers 510 at least partially above the lateral separation chamber outlet 518. Each collection chamber deflector 520 extends between two of the vertical lateral walls 512 (in a similar manner as deflector 120 in FIG. 4). The collection chamber deflector 520 acts to further increase gas catalyst separation and ensure no direct path for riser hydrocarbon vapor and entrained catalyst to RTD outlet 525 towards gas outlet tube. The gas collection chamber dipleg 530, submerged in the stripping catalyst bed 10, ensures no riser hydrocarbon vapor can escape through a gas collection chamber outlet 523 open to the reactor. The collection chamber dipleg 530 also ensure that fines returning from the cyclone diplegs 515 cannot directly get re-entrained through gas collection chamber outlet 525.

As shown in FIGS. 2A-2B, collection chamber deflector 520 acts to add another stage of separation in each gas collection chamber 510. Current RTDs have a potential for gas-solid streams to flow directly from the separation chamber outlet 518 to main outlet ducting connecting the RTD to the cyclone inlets. In embodiments of the present disclosure, deflector 520 forces the gas entering from the lateral separation chamber outlets 518 to make another 180° turn, i.e. re-direct flow, as indicated schematically by flow arrow 537, similarly to a deflector 527 used in the separation chamber 508. The differential momentums of the gas and catalyst will result in further separation and a lower loading to the cyclones. This tends to improve overall system separation efficiency. In the embodiment of FIGS. 2A and 2B, collection chamber deflector 520 and deflector 527 terminate at the same vertical position. The concave surface 526 of the deflector 520 faces the stripping bed 10.

Figure 3A:
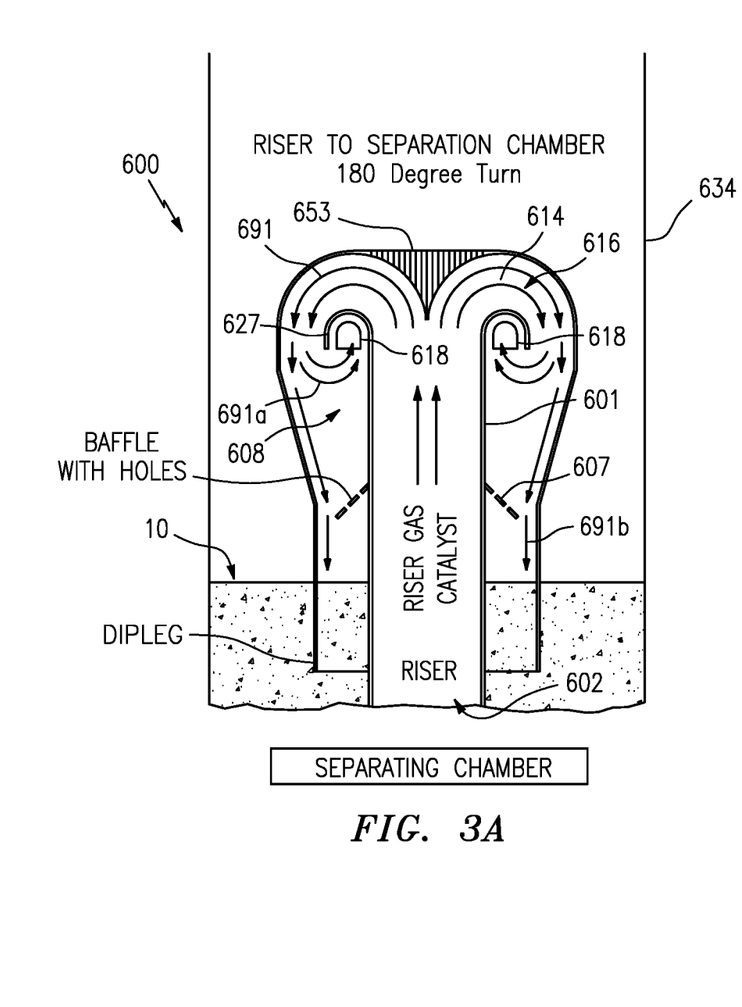
FIG. 3A is is a schematic cross-sectional side plan view of another embodiment of an apparatus for separating a gaseous mixture from a stream of particles entering from a riser reactor used for cracking a hydrocarbon feed constructed in accordance with the present disclosure, showing two separation chambers, ninety degrees apart, where each separation chamber includes a riser having a concave deflector at the riser outlet to provide a smooth 180° turn to gas and catalyst particles exiting the riser reactor and entering the RTD.
Figure 3B:
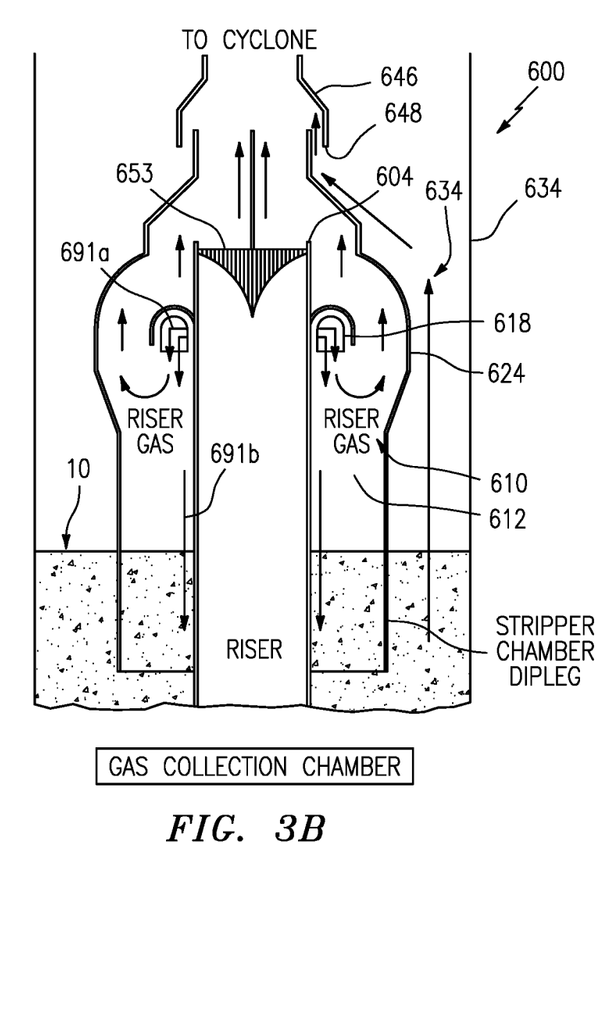
FIG. 3B is a schematic cross-sectional side plan view of the embodiment of FIG. 3A, showing two collection chambers each with a collection chamber deflector under which gas from the separation chamber has to make a 180° turn prior to exiting via the outlet tube.

As shown in FIGS. 3A-3B, another embodiment of an apparatus 600 for separating a gaseous mixture from a stream of particles entering from a central riser reactor 601 is shown. The separation chambers 608, two of which are shown in FIG. 3A, each include a separation chamber inlet 614 in an upper area 616 of the separation chamber 608 communicating with the riser reactor 601. The gases/particulates (schematically shown with flow arrows 691) from riser 601 take an initial 90° turn from the riser reactor 601 followed by another 90° around the separation chamber deflector 627, gasses and entrained catalyst (schematically shown by flow arrow 691a) then take another 180° turn under the separation chamber deflector 627, while catalyst particles (indicated schematically with flow arrows 691b) separate from the gasses and drop to the catalyst bed 10. Apparatus 600 is similar to apparatus 500, as collection chamber outer wall 624 of each collection chamber 610 extends from the lateral separation chamber outlet 618 toward and into the lower stripping bed area 10. Because collection chamber outer wall 624 is submerged in the lower stripping bed area 10, apparatus 600 includes an open slip unit vent 648 to provide a flow path for stripping gas and entrained hydrocarbons to escape from the reactor to gas outlet tube 646. Apparatus 600 differs from apparatus 500 in that riser 601 includes a parabolic concave cone-shaped deflector 653 at a riser outlet 604. Where the apex of the deflector 653 is facing downward toward the riser inlet 602. The apparatus 600 also includes baffles 607 in the separation chambers 608. The baffles 607 can be annular segments positioned around riser reactor 601, for example.

Figure 4A:
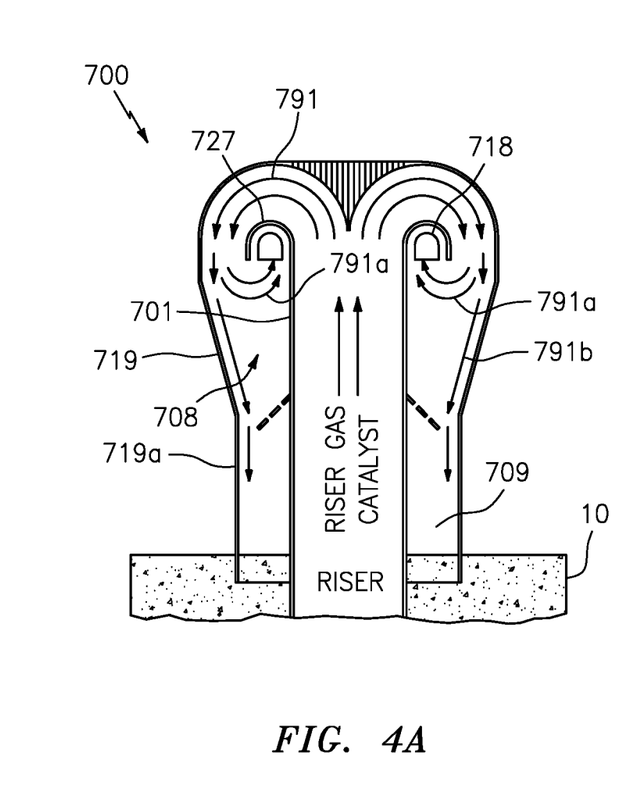
FIG. 4A is a schematic cross-sectional side plan view of another embodiment of an apparatus for separating a gaseous mixture from a stream of particles entering from a riser reactor used for cracking a hydrocarbon feed constructed in accordance with the present disclosure, showing two separation chambers, ninety degrees apart, where each separation chamber includes a riser having a concave deflector at the riser outlet to provide a smooth 180° turn to gas and catalyst particles exiting the riser reactor and entering the RTD, and showing a common separation chamber outer wall that terminates in the stripping catalyst bed, e.g. a separation chamber dipleg.
Figure 4B:
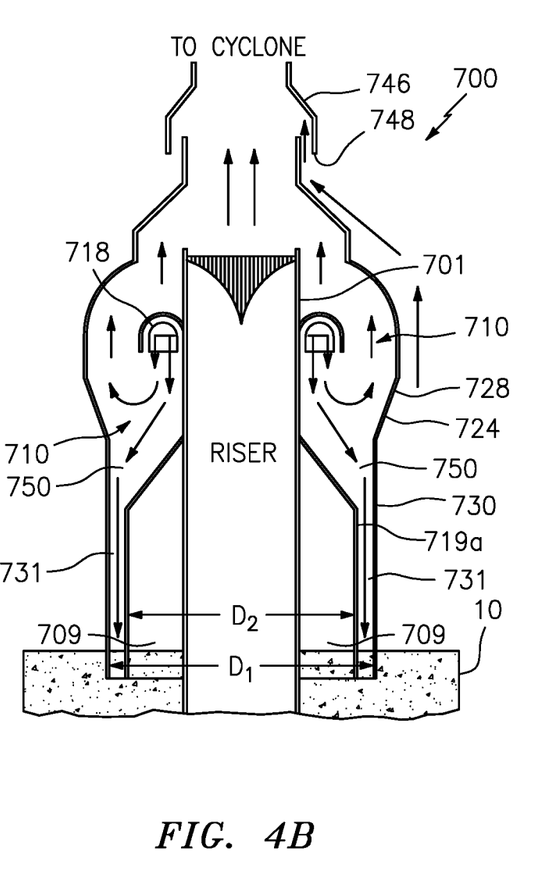
FIG. 4B is a schematic cross-sectional side plan view of the embodiment of FIG. 4A, showing two collection chambers each with a collection chamber deflector under which gas from the separation chamber has to make a 180° turn prior to exiting via the outlet tube and showing a collection chamber with a common collection chamber outer wall that terminates in the stripping catalyst bed, e.g. a collection chamber dipleg, where the dipleg of the collection chamber surrounds the separation chamber dipleg.

As shown in FIGS. 4A-4B, another embodiment of an apparatus 700 for separating a gaseous mixture from a stream of particles entering from a central riser reactor 701 is shown. Apparatus 700 is similar to apparatus 600, except that a collection chamber outer wall 724 includes an inclination section 728 that converges towards the riser reactor 701 and a substantially vertical cylindrical wall 730 that forms a common dipleg area 731 below the inclination section 728. The substantially vertical cylindrical wall 730, or skirt, below the inclination section 728 is a continuous cylinder that forms an annular common dipleg area 731 about the riser reactor 701 such that stripping gas exit windows 750 for each collection chamber 710 are all in fluid communication with the common dipleg area 731. The substantially vertical wall 730 extends towards and into the lower stripping bed area 10. The gases/particulates (schematically shown with flow arrows 791) from riser 701 take an initial 90° turn from the riser reactor 701 followed by another 90° around the separation chamber deflector 727, gasses and entrained catalyst (schematically shown by flow arrow 791a) then take another 180° turn under the separation chamber deflector 727, while catalyst particles (indicated schematically with flow arrows 791b) separate from the gasses and drop to the catalyst bed 10. Apparatus 700 is similar to apparatus 100, as described below, except instead of having outer wall 724 stop above each exit window 750, like outer walls 124 and their equivalent inclination section stopping above each exit window 150, a single cylindrical wall 730 begins at the lower edge of each inclination section 728 and extends downward into the catalyst bed.

With continued reference to FIGS. 4A-4B, apparatus 700 includes a separation chamber outer wall 719 that extends from the lateral separation chamber outlet 718 toward and into the lower stripping bed area 10. The separation chamber outer wall 719 is a common separation chamber outer wall 719 for each separation chamber 708 such that a separation chamber dipleg area 709 extends continuously circumferentially about longitudinal axis A. The collection chamber outer wall 724 is concentric with separation chamber outer wall 719. The substantially vertical wall 730 has a diameter D1 greater than a diameter D2 of lower portion 719a of separation chamber outer wall 719 that defines the separation chamber dipleg area 709. Apparatus 700 includes an open slip unit vent 748 to provide a flow path for stripping gas and vapors from reactor to escape to gas outlet tube 746 now that the collection chamber 710 is enclosed at the bottom via vertical wall 730.

Figure 5:
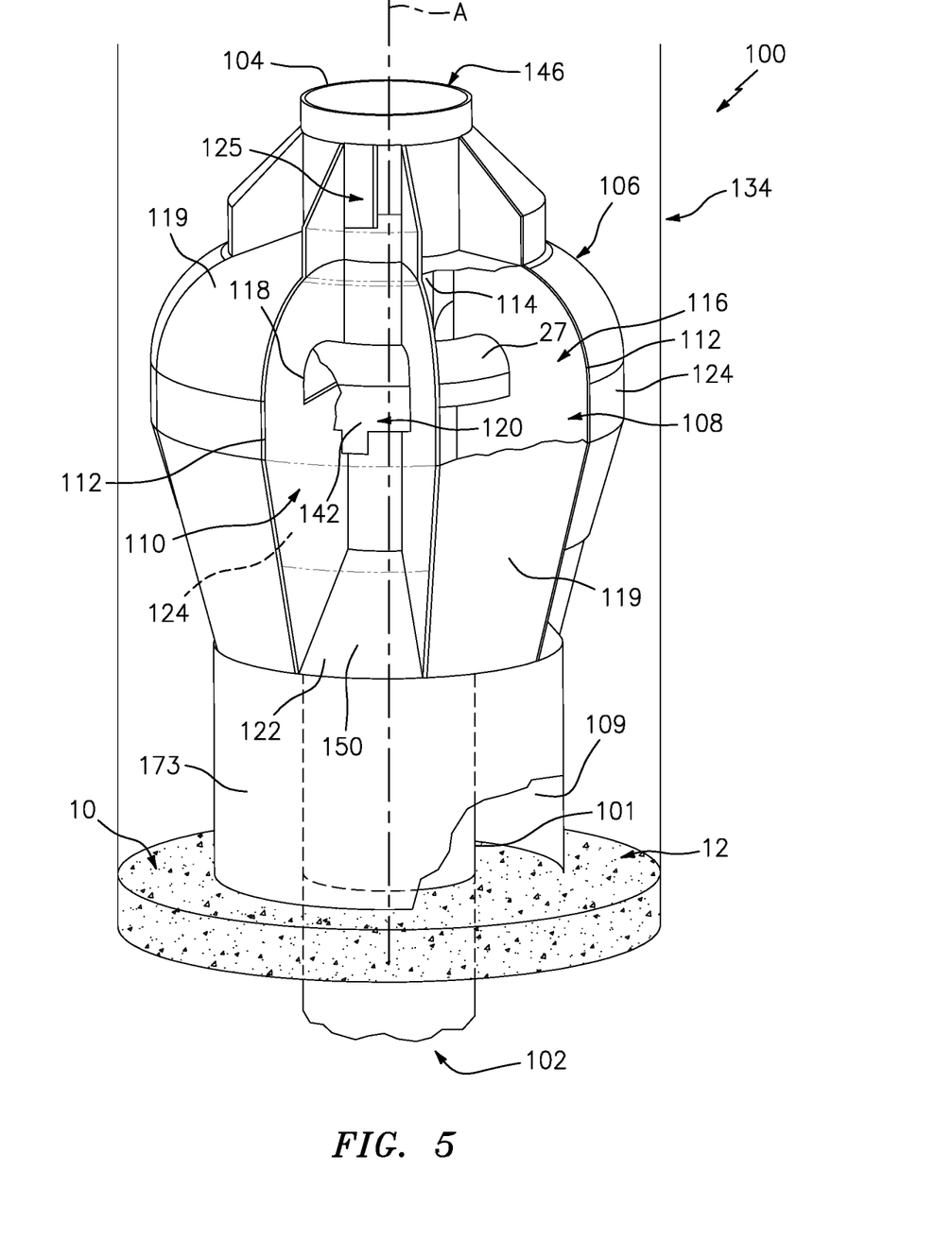
FIG. 5 is a schematic perspective cut-away view of an apparatus for separating a gaseous mixture from a stream of particles entering from a riser reactor used for cracking a hydrocarbon feed constructed in accordance with the present disclosure, showing a separation vessel having alternating separation chambers and collection chambers, with one of the collection chamber outer walls shown translucently and one of the separation chamber outer walls is shown partially cut-away.
Figure 6:
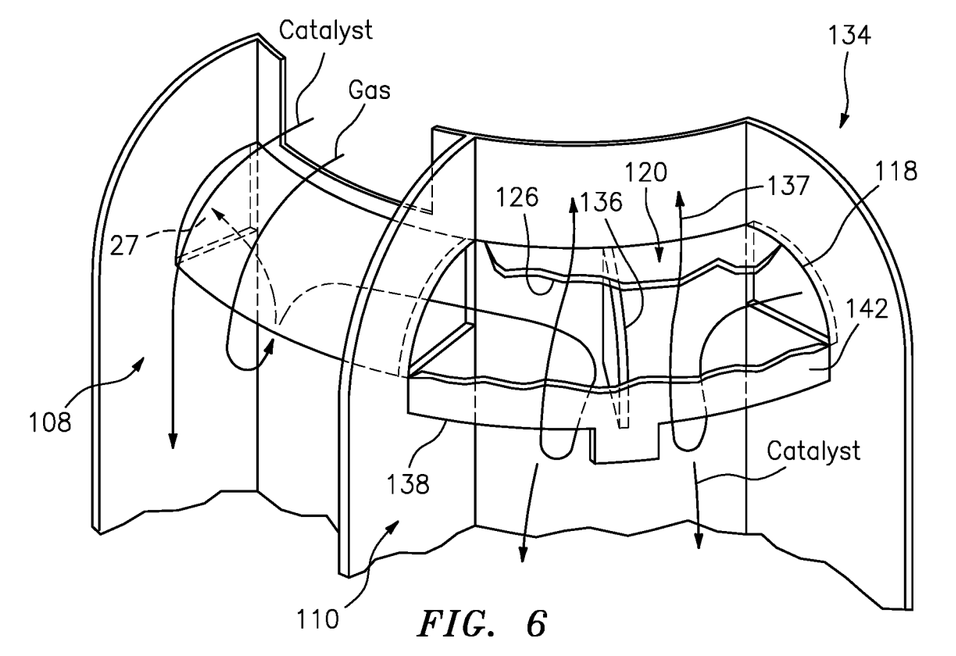
FIG. 6 is a schematic perspective view of the apparatus of FIG. 5, showing the collection chamber deflector extending from the separation chamber deflector, and a divider baffle positioned under the collection chamber deflector.
Figure 7:
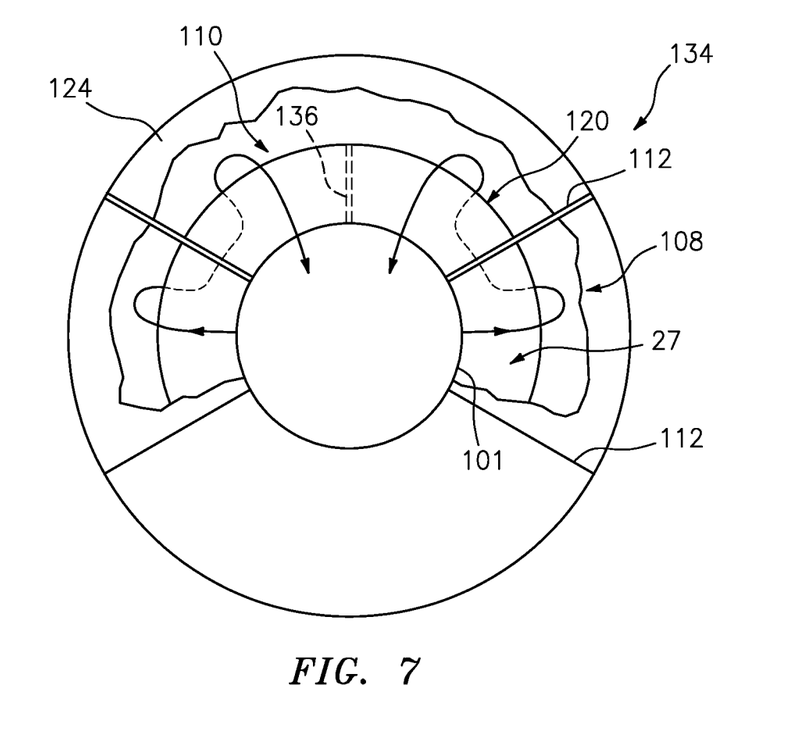
FIG. 7 is a schematic top plan view of the apparatus of FIG. 5, showing the fluid/particle flow from the riser reactor, to the separation chamber and then to the collection chamber.

As shown in FIGS. 5-7, an apparatus 100 for separating a gaseous mixture from a stream of particles entering from a central riser reactor 101 used for cracking a hydrocarbon feed with said stream of particles includes a reaction vessel 134 comprising a lower stripping bed area 10 and an upper secondary separator area 12. The riser reactor 101 is positioned within the reaction vessel 134. The riser reactor 101 defines a longitudinal axis A and including a riser reactor inlet 102 at one end for receiving the hydrocarbon feed and the stream of particles and at least one riser reactor outlet 104 at an opposite end for evacuating a mixture of cracked gases and solid particles. The apparatus 100 includes a separation vessel 106 defined proximate to the riser reactor outlet 104. The separation vessel 106 includes, in an alternating manner, separation chambers 108 and collection chambers 110 distributed about the longitudinal axis A.

With continued reference to FIGS. 5-7, each separation chamber 108 comprises two substantially vertical lateral walls 112 which also comprise a wall of the adjacent collection chamber 110. The separation chamber 108 includes a separation chamber inlet 114 in an upper area 116 of the separation chamber 108 communicating with the riser reactor 101. Each separation chamber 108 includes a separation chamber outer wall 119 that extends downward into the catalyst bed 10. The separation chamber outer wall 119 includes a vertically extending skirt 173 that forms a common dipleg area 109 for each of the separation chambers 108. The common dipleg area 109 is in fluid communication with each of the separation chambers 108. The separation chamber dipleg area 109 extends continuously circumferentially about longitudinal axis A. Lateral separation chamber outlets 118 are defined in each of the vertical lateral walls 112 to provide fluid and particle communication from the lateral separation chamber 108 to the adjacent collection chamber 110. The apparatus 100 includes at least one collection chamber deflector 120 positioned in the gas collection chambers 110 at least partially above the lateral separation chamber outlet 118. Each collection chamber deflector 120 extends between two of the vertical lateral walls 112. The collection chamber deflector 120 acts to further increase gas catalyst separation and ensure no direct path for riser hydrocarbon vapor to get to gas collection chamber outlet 125.

As shown in FIG. 6, collection chamber deflector 120 acts to add another stage of separation in each gas collection chamber 110. The separation chamber includes a deflector "curved plate" 27, which is generally referred as a separation chamber deflector 27. The lateral separation chamber outlets 118 are underneath the separation chamber deflector 27, one on each end, connected to gas collection chamber 110. The separation chamber deflector 27 and the collection chamber deflector 120 are connected to one another, unitarily formed, or the like such that the deflectors 27 and the collection chamber deflectors 120 form an annulus about the riser 101. This extension of the separation chamber deflector 27 into the collection chamber 110 as the collection chamber deflector 120 allows for gas and catalyst particles to take additional turn promoting gas particle separation in the gas collection chamber. Current RTDs have a potential for gas-solid streams to flow directly from the separation chamber outlet 118 to main outlet ducting connecting the RTD to the cyclone inlets. In embodiments of the present disclosure, deflector 120 forces the gas entering from the lateral separation chamber outlets 118 to make another 180° turn, i.e. re-direct flow, as indicated schematically by flow arrow 137, similarly to a separation chamber deflector 27 used in the separation chamber 108. The differential momentums of the gas and catalyst will result in further separation and a lower loading to the cyclones. This tends to improve overall system separation efficiency. The chamber deflector 120 can include a divider baffle 136 extending from a concave surface 126 for the collection chamber deflector. In the embodiment of FIGS. 5-7, divider baffle 136 does not extend beyond a lower edge 138 of the deflector 120 in a direction parallel to the longitudinal axis A. Those skilled in the art will readily appreciate that baffle 136 can also extend to a vertical position below the lower edge 138.

With continued reference to FIGS. 5-7, embodiments of apparatus 100 differ from embodiments of apparatus 700 in that, instead of having collection chamber outer wall 124 extend downward into catalyst bed 10, like outer wall 724 and its cylindrical wall 730 that extends therefrom, the collection chamber outer wall 124 stops before catalyst bed 10. The front facing collection chamber outer wall 124 of FIG. 5 is shown translucently so that deflector 120 can be readily seen. In apparatus 100, each collection chamber 110 includes a collection chamber floor 122 that together with the collection chamber outer wall 124, the vertical lateral walls 112 and the central riser reactor 101 define the collection chamber 110. A stripping gas exit window 150, e.g. collection chamber window, is provided between the collection chamber outer wall 124 and the chamber floor 122 to allow stripping gas and entrained hydrocarbons to exit from reactor stripper section to the gas collection chamber 110 followed to chamber outlet 125. The concave surface 126 of the deflector 120 faces the collection chamber floor 122. Collection chamber deflector 120 is shown with an extended wall 142 (as compared with separation chamber deflector 27 in the separation chamber 108), but those skilled in the art will readily appreciate that a variety of lengths for wall 142 can be used.

Figure 8:
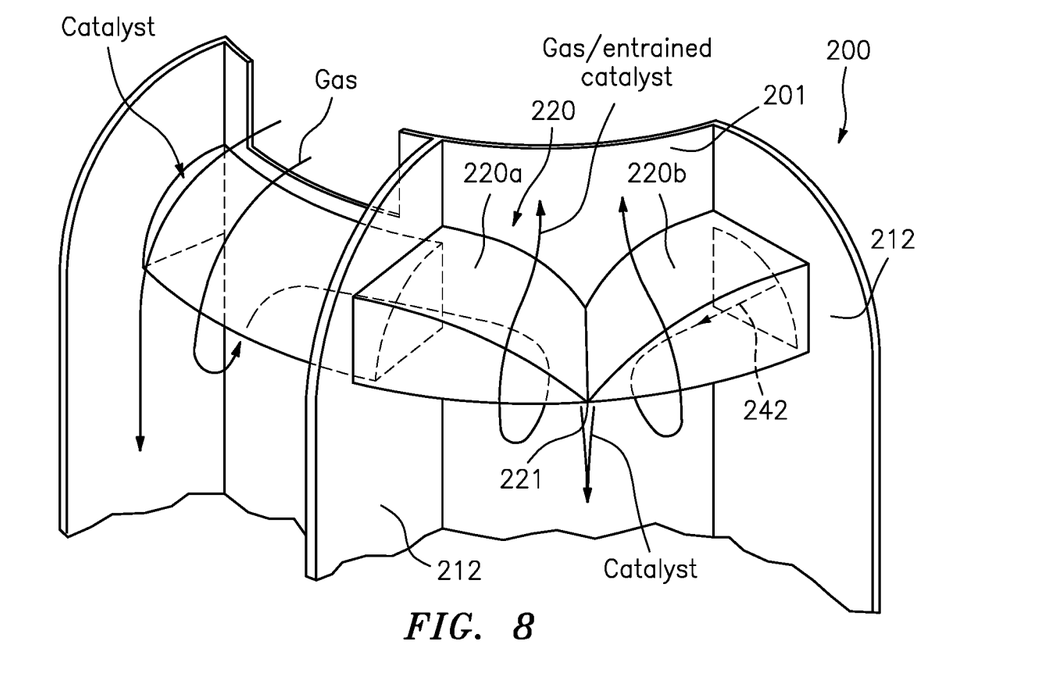
FIG. 8 is a schematic perspective view of another embodiment of an apparatus for separating a gaseous mixture from a stream of particles entering from a riser reactor used for cracking a hydrocarbon feed constructed in accordance with the present disclosure, showing a collection chamber deflector with a central cusp.

As shown in FIG. 8, another embodiment of an apparatus 200 for separating a gaseous mixture from a stream of particles entering from a central riser reactor 201 is shown. Apparatus 200 is the same as apparatus 100 except that the apparatus 200 includes another embodiment of a collection chamber deflector 220, as shown. Collection chamber deflector 220 is the same as collection chamber deflector 120 except that, instead of being open or including a divider baffle, collection chamber deflector 220 includes a downward pointing cusp portion 221 at the intersection of two deflector portions 220a and 220b. The cusp portion 221 is centrally located between two of the vertical lateral walls 212. Each deflector portion 220a and 220b provides its own independent half-turn for the gas-solid fluid entering from the separation chamber, as indicated schematically by flow arrow 242 in FIG. 8. The downward sloping shape of each deflector portions 220a and 220b make it so that a divider, e.g. divider 136, may not be needed.

Figure 9:
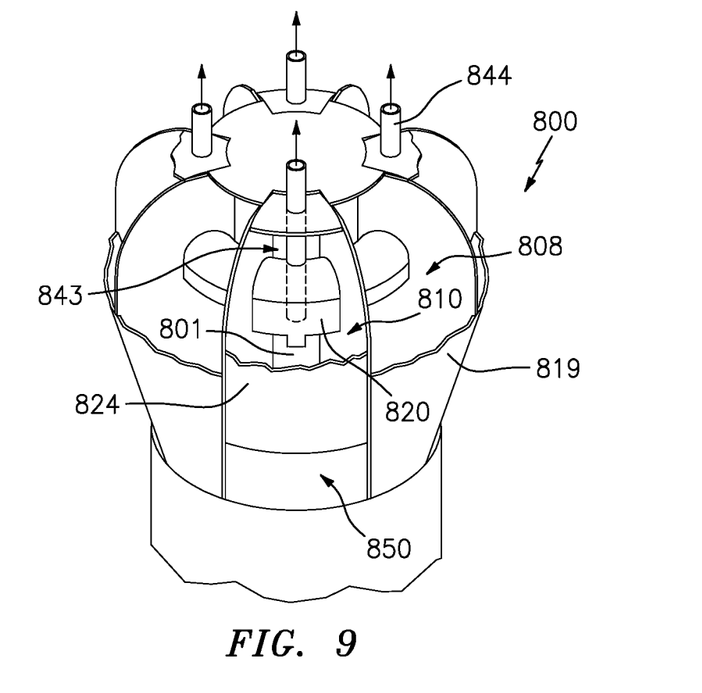
FIG. 9 is a schematic perspective view of another embodiment of an apparatus for separating a gaseous mixture from a stream of particles entering from a central riser reactor used for cracking a hydrocarbon feed constructed in accordance with the present disclosure, showing a conduit in penetrating through the collection chamber underflow baffle as a means to transport the gas directly to the gas outlet tube.

With reference now to FIG. 9, another embodiment of an apparatus 800 for separating a gaseous mixture from a stream of particles entering from a central riser reactor 801 is shown. Apparatus 800 is similar to apparatus 100 except that the apparatus 800 includes a collection chamber conduit 844 in an upper area 843 of each collection chamber 810 for evacuating the cracked gases and a minor portion of the solid particles from the collection chambers 810 to a gas outlet tube (shown in FIG. 4 as 146). Each collection chamber conduit 844 extends downward through a collection chamber deflector 820, which is similar to collection chamber deflector 120. Collection chamber outer wall 824 and separation chamber outer wall 819 are shown partially removed to show the interior of collection chambers 810 and separation chambers 808. Collection chambers 810 are similar to collection chambers 110 of FIG. 5. Each collection chamber includes a respective stripping gas exit window 850, similar to stripping gas exit window 150. Separation chambers 808 include a common dipleg area, similar to common dipleg area 109.

Figure 10:
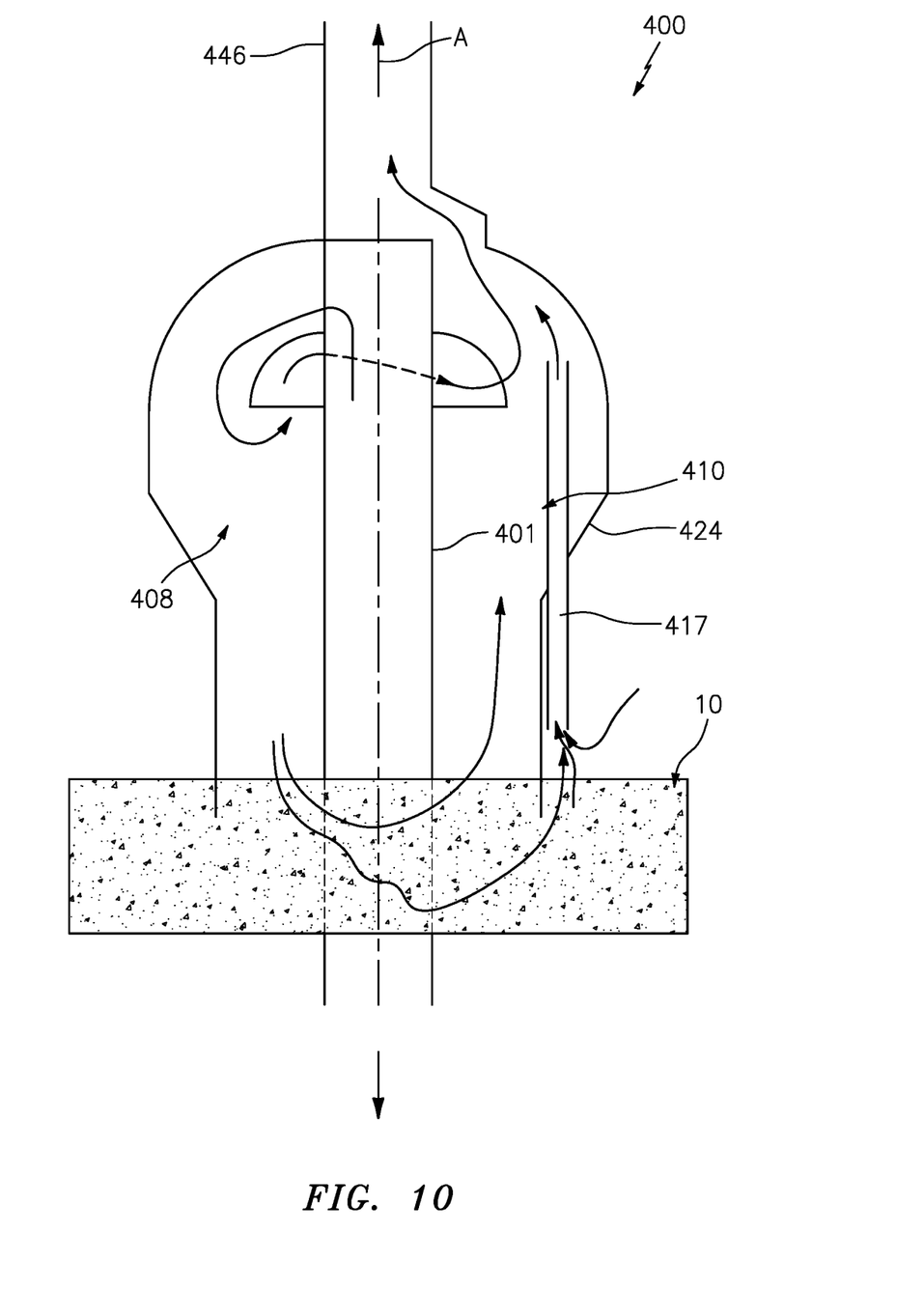
FIG. 10 is a schematic cross-sectional side plan view of another embodiment of an apparatus for separating a gaseous mixture from a stream of particles entering from a riser reactor used for cracking a hydrocarbon feed constructed in accordance with the present disclosure, showing a collection chamber outer wall that includes a stripping gas entrance conduit and a vent pipe.

With reference now to FIG. 10, another embodiment of an apparatus 400 for separating a gaseous mixture from a stream of particles entering from a central riser reactor 401 is shown. Apparatus 400 is generally the same as apparatus 500. Apparatus 400 includes a plurality of separation chambers 408 and collection chambers 410. Collection chamber outer wall 424 of each collection chamber 410 extends from the lateral separation chamber outlet 418 toward the lower stripping bed area 10, e.g. catalyst bed, and is submerged in the catalyst bed 10. Apparatus 400 includes a stripping gas conduit 417 configured and adapted to provide an additional flow path through outer wall 424 for stripper gas to exit the reactor apparatus 400 via gas outlet tube 446 to one or more cyclones.

The methods and systems of the present disclosure, as described above and shown in the drawings, provide for increased gas catalyst separation by utilizing the gas collection chamber to further separate the gas from the catalyst. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An apparatus for separating a gaseous mixture from a stream of particles entering from a riser reactor used for cracking a hydrocarbon feed with said stream of particles, said apparatus comprises:
    a reaction vessel comprising a lower stripping bed area and an upper secondary separator area;
    a riser reactor within the reaction vessel, the riser reactor defining a longitudinal axis and including a riser reactor inlet at one end for receiving the hydrocarbon feed and the stream of particles and at least one riser reactor outlet at an opposite end for evacuating a mixture of cracked gases and solid particles;
    a separation vessel defined proximate to the at least one riser reactor outlet, the separation vessel comprising:
        in an alternating manner, at least one separation chamber and at least one collection chamber distributed about the longitudinal axis, each separation chamber comprises two vertical lateral walls which also comprise a wall of an adjacent one of the at least one collection chamber, the at least one separation chamber including a separation chamber inlet in an upper area of the separation chamber communicating with the riser reactor, wherein a lateral separation chamber outlet is defined in at least one of the vertical lateral walls to provide fluid and particle communication from the lateral separation chamber to the adjacent one of the at least one collection chamber; and
        at least one collection chamber deflector positioned in the at least one collection chamber.

2. The apparatus of claim 1, wherein the at least one separation chamber includes two separation chambers, with one of the at least one collection chambers therebetween, and wherein the at least one collection chamber deflector extends between one of the two vertical lateral walls of a first one of the two separation chambers and one of the two vertical lateral walls of a second one of the two separation chambers.

3. The apparatus of claim 1, wherein each collection chamber comprises a collection chamber outer wall that includes a stripping gas entrance window to allow a stripping gas from at least one stripping gas injector proximate to the lower stripping bed area to enter the collection chamber.

4. The apparatus of claim 3, wherein each collection chamber comprises a collection chamber floor that together with the collection chamber outer wall, the vertical lateral walls and the central riser reactor define the collection chamber.

5. The apparatus of claim 4, wherein the at least one collection chamber deflector includes a concave surface facing the collection chamber floor.

6. The apparatus of claim 1, wherein the at least one collection chamber deflector includes a downward pointing cusp portion.

7. The apparatus of claim 6, wherein the cusp portion is centrally located between two of the vertical lateral walls.

8. The apparatus of claim 1, wherein the collection chamber deflector includes a divider baffle extending from a concave surface of the collection chamber deflector.

9. The apparatus of claim 8, wherein the divider baffle extends beyond a lower edge of the deflector in a direction parallel to the longitudinal axis.

10. The apparatus of claim 1, further comprising at least one collection chamber conduit in an upper area of the collection chamber for evacuating the cracked gases and a minor portion of the solid particles from the collection chambers to a gas outlet collector.

11. The apparatus of claim 10, wherein the at least one collection chamber conduit extends downward through the collection chamber deflector.

12. The apparatus of claim 1, wherein each collection chamber comprises a collection chamber outer wall that extends from the lateral separation chamber outlet into the lower stripping bed area.

13. The apparatus of claim 12, wherein each collection chamber includes a collection chamber floor, wherein the collection chamber floor, the collection chamber outer wall, the vertical lateral walls and the central riser reactor together define the collection chamber.

14. The apparatus of claim 12, wherein each collection chamber outer wall extends to form a single common dipleg that extends into the lower stripping bed in a continuous circumferential direction around the riser reactor.

15. The apparatus of claim 12, wherein each collection chamber outer wall extends to form a respective dipleg that extends into the lower stripping bed.

16. The apparatus of claim 1, wherein each collection chamber is surrounded by a common collection chamber floor, wherein the collection chamber floor, the collection chamber outer wall, the vertical lateral walls and the central riser reactor together define the collection chamber.

17. The apparatus of claim 1, wherein at least one of the at least one separation chamber further comprises a separation chamber deflector positioned at least partially above the lateral separation chamber outlet.

18. The apparatus of claim 17, wherein the separation chamber deflector is unitarily formed with the collection chamber deflector.

19. The apparatus of claim 1, wherein the at least one collection chamber deflector is positioned at least partially above the lateral separation chamber outlet.

20. The apparatus of claim 1, wherein the riser reactor includes a parabolic concave cone-shaped riser deflector at the at least one riser reactor outlet.

21. An apparatus for separating a gaseous mixture from a stream of particles entering from a riser reactor used for cracking a hydrocarbon feed with said stream of particles, said apparatus comprises:
- a reaction vessel comprising a lower stripping bed area and an upper secondary separator area;
- a riser reactor within the reaction vessel, the riser reactor defining a longitudinal axis and including a riser reactor inlet at one end for receiving the hydrocarbon feed and the stream of particles and at least one riser reactor outlet at an opposite end for evacuating a mixture of cracked gases and solid particles;
- a separation vessel defined proximate to the at least one riser reactor outlet, the separation vessel comprising, in an alternating manner, at least one separation chamber and at least one collection chamber distributed about the longitudinal axis, each separation chamber comprises two vertical lateral walls which also comprise a wall of the adjacent collection chamber, the separation chamber including a separation chamber inlet in an upper area of the separation chamber communicating with the riser reactor; and
- a lateral separation chamber outlet defined in at least one of the vertical lateral walls to provide fluid and particle communication from the separation chamber to an adjacent one of the at least one collection chamber, wherein each collection chamber comprises a collection chamber outer wall that extends from the lateral separation chamber outlet into the lower stripping bed area, and wherein each separation chamber further comprises a separation chamber outer wall that extends from the separation chamber inlet into the lower stripping bed area.

22. The apparatus of claim 21, wherein the collection chamber outer wall is a common collection chamber outer wall that extends towards the lower stripping bed in a continuous circumferential direction around the riser reactor.

23. The apparatus of claim 21, wherein the collection chamber outer wall includes an inclination section towards the riser reactor and a vertical wall below the inclination section.

24. The apparatus of claim 21, wherein the collection chamber outer wall has a diameter equal to or less than a diameter of the separation chamber outer wall.

25. The apparatus of claim 21, further comprising at least one collection chamber deflector positioned in the adjacent gas collection chamber at least partially above the lateral separation chamber outlet.

26. The apparatus of claim 25, wherein the at least one collection chamber deflector is positioned at least partially above the lateral separation chamber outlet.

27. The apparatus of claim 25, wherein the at least one collection chamber deflector includes a concave surface facing the lower stripping bed area.

28. The apparatus of claim 25, wherein the at least one separation chamber is two separation chambers, and wherein the at least one collection chamber deflector extends between one of the two vertical lateral walls of a first one of the two separation chambers and one of the two vertical lateral walls of a second one of the two separation chambers.

29. The apparatus of claim 25, wherein the at least one collection chamber deflector includes a downward pointing cusp portion.

30. The apparatus of claim 29, wherein the cusp portion is centrally located between two of the vertical lateral walls.

31. The apparatus of claim 25, wherein the collection chamber deflector includes a divider baffle extending from a concave surface for the collection chamber deflector.

32. The apparatus of claim 31, wherein the divider baffle extends beyond a lower edge of the deflector in a direction parallel to the longitudinal axis.

33. The apparatus of claim 25, further comprising at least one collection chamber conduit in an upper area of the collection chamber for evacuating the cracked gases and a minor portion of the solid particles from the collection chambers to a gas outlet collector.

34. The apparatus of claim 33, wherein the at least one collection chamber conduit extends downward through the collection chamber deflector.

35. The apparatus of claim 25, wherein at least one of the at least one separation chamber further comprises a separation chamber deflector positioned at least partially above the lateral separation chamber outlet.

36. The apparatus of claim 35, wherein the separation chamber deflector is unitarily formed with the collection chamber deflector.

37. The apparatus of claim 21, wherein the riser reactor includes a parabolic concave cone-shaped riser deflector at the at least one riser reactor outlet.

* * * * *